Figure 1:
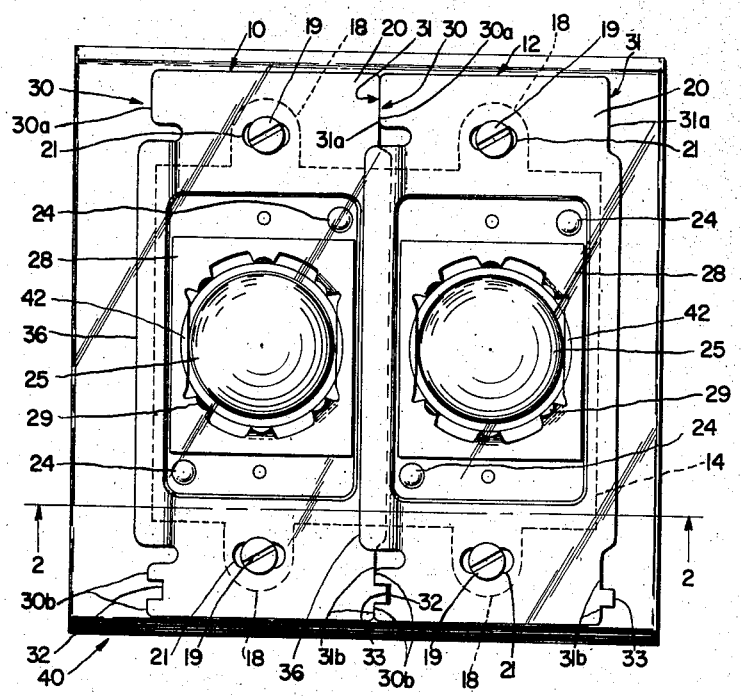

June 2, 1959  
C. M. CHRISTENSEN  
2,889,437  
ALIGNING AND LOCATING ARRANGEMENT  
Filed Dec. 16, 1957

INVENTOR.  
CARLO M. CHRISTENSEN  
BY  
ATTORNEY

United States Patent Office 2,889,437
Patented June 2, 1959

2,889,437

ALIGNING AND LOCATING ARRANGEMENT

Carlo M. Christensen, Freeport, Ill., assignor to Minneapolis-Honeywell Regulator Company, Minneapolis, Minn., a corporation of Delaware Application December 16, 1957, Serial No. 702,891

8 Claims. (Cl. 200—168)

The present invention is directed to an arrangement for accurately locating a plurality of devices with respect to each other in a supporting structure so as to properly accommodate a cover member having openings therethrough arranged to closely fit about protruding portions of said devices.

Essentially, the invention is directed to alleviating a problem that has arisen in the mounting of switches known as "Tap-Lite" wall switches in an outlet box. These switches can be gang mounted in an outlet box and unitary cover plates are provided for this purpose. A cover plate of this type includes openings for the passage therethrough of the actuators of the switches. These openings fit closely about the actuators. Further, the cover plate is provided with integral mounting rings, the openings of the cover plates forming the inner periphery of the rings. The rings are arranged to cooperate with spring means provided on the switches, which means are arranged in a peripheral manner about the actuators so as to cooperate with the outer periphery of the mounting rings to maintain the cover plate in place. The problem mentioned initially makes its presence felt when the switches are not accurately aligned and located with respect to each other in the outlet box. Thus, under this set of circumstances, the actuators of the switches and the openings of the cover plate do not exactly coincide and, since the openings are arranged to fit closely about the actuators, an interference arises necessitating relocation and realignment of the switches in the outlet box on a trial and error proposition until proper alignment is realized, whereupon the cover plate can be accommodated by the switches and the spring means thereof, thereby maintaining the cover plate in place.

Further, a problem has arisen in the gang mounting of switches which include mounting plates designed to entirely cover the outlet box opening when said switches are located in place. Switches of the prior art which include such mounting plates while designed for and accommodated in outlet boxes arranged to accept a single switch are not normally arranged to be gang mounted in an outlet box arranged to receive two switches. This is due to the fact that an outlet box arranged to receive two switches is less than twice as wide as an outlet box arranged to receive a single switch, and, as was mentioned previously, the switches under consideration are devised to properly fit in an outlet box arranged to receive a single switch. Thus, unless snap off portions or similar provisions are incorporated on the mounting plates, the mounting plates of the switches must be overlapped with a tilting of one of the mounting plates with respect to the other resulting.

As disclosed herein, an arrangement is provided for accurately aligning and locating switches of the type under consideration by the inclusion of aligning and locating means. These means are divisible in that aligning portions or elements are located on each switch. The aligning means include interjoining or interlinking portions which positively locate the switches with respect to each other for properly accommodating the cover plate. The forementioned aligning means can take the form of a tongue and notch construction among others. By utilizing such an arrangement, simple fabrication procedures can be employed. Further, devices including aligning means of the type disclosed herein lend themselves to be easily located and aligned in a supporting structure and no complex assembly manipulations are involved.

The present disclosure further includes means which not only serve to align a plurality of switches of the type having mounting plates devised to entirely cover the opening of an outlet box, but which allow the gang mounting of switches without the necessity of incorporating snap off portions or similar provisions on the mounting plates. Specifically, the disclosure sets forth an arrangement wherein an upset portion of a mounting plate of one of the switches is allowed to overlap a complementary portion of the mounting plate of a second of the switches so as to properly locate the switches when mounted side by side in an appropriate outlet box. As will become more apparent below, the overlapped portions of the mounting plates also serve to accurately locate the mounting plates in place in the outlet box.

Therefore, it is an object of this invention to provide an arrangement for accurately aligning a pair of devices with respect to each other in a supporting structure to thereby accommodate a cover member having openings therethrough arranged to fit closely about protrusions extending from the devices.

It is another object to provide the forementioned arrangement wherein the aligning means include a portion or element thereof on each device which portions or elements positively interjoin or interlink the devices.

It is still another object of this invention to provide the last mentioned arrangement wherein the positive interjoining or interlinking aligning means utilize a notch portion and tongue element arrangement or a similar complementary telescoping male and female element arrangement.

It is a further object of this invention to provide an arrangement for aligning a pair of devices including mounting plates with respect to each other in a supporting structure wherein the mounting plate of one of the devices includes an upset portion arranged to cooperate with a complementary portion of the mounting plate of the other devices so as to accurately locate said devices with said mounting plates in a coplanar relationship.

It is a still further object of this invention to provide an arrangement for gang mounting a plurality of switches having mounting plates arranged to completely cover the opening of an outlet box by providing the mounting plate of one of said switches with an upset portion arranged to cooperate with a complementary portion of the mounting plate of another of said switches.

Figure 2:
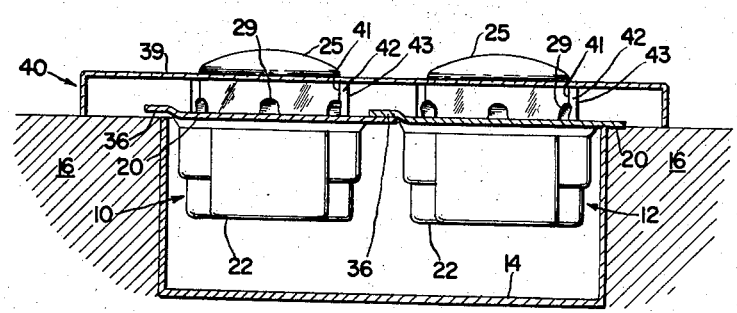

These and other objects will become more apparent from a reading of the following specification and appended claims in conjunction with the drawing wherein:

Figure 1 is a view of a pair of wall switches located in an outlet box with a transparent cover plate in place; and Figure 2 is a cross sectional view of the arrangement of Figure 1 taken along lines 2—2 thereof.

Referring to Figures 1 and 2 of the drawing, a pair of devices, in the form of push button actuated wall switches 10 and 12, are located in a supporting structure or outlet box 14, which outlet box is supported in a wall 16 of a structure. The outlet box 14 includes a plurality of mounting tabs 18 to which fastening means 19 of the wall switches 10 and 12 can be attached for securing the wall switches 10 and 12 in place. The wall switches 10 and 12 each include a main mounting plate 20 having openings 21 with which the forementioned fastening means 19 are associated. The shape of the openings 21 allow for manipulation of the fastening means 19 to accommodate the mounting tabs 18 of the outlet box 14.

Switch mechanisms 22 are fastened to one surface of the mounting plates 20 by means of rivets 24. The switch mechanisms 22 include cylindrical, reciprocal actuators 25 which protrude through appropriate openings, not shown, in the mounting plates 20. Each of the mounting plates 20 have welded to the surface of the mounting plate 20 opposite to the surface abutting the switch mechanisms 22, a plate 28 which is formed with a plurality of spring fingers 29, the function of which will become apparent below.

The wall switches 10 and 12 each include a pair of guide surfaces 30 and 31. Each of the guide surfaces is made up of two portions. Thus, guide surface 30 includes a first straight portion 30a which is substantially parallel with the longitudinal axis of the switch and which is located near a first extremity of the wall switch. A second straight portion 30b of the guide surface 30 which is substantially parallel with the longitudinal axis of the switch is located near a second extremity of the wall switch. The second portion 30b of the guide surface 30 is interrupted by a female portion or notch 32. The second guide surface 31 is also comprised of two portions. A first portion 31a is straight and substantially parallel to the longitudinal axis of the switch and is located near the first extremity of the wall switch. A second straight portion 31b of the guide surface 31 is located near the second extremity of the switch and is substantially parallel to the longitudinal axis of the switch except for a protruding male portion or tongue 33. It will be noted that the first portions 30a and 31a and the second portions 30b and 31b, as well as the notches 32 and tongues 33 are complementary and allow for abutment or mating of the guide surfaces 30 and 31 with the wall switches 10 and 12 in place in the outlet box 14. While the guide portions of the guide surfaces 30 and 31 are shown as substantially straight and parallel in nature, it is of course apparent that this need not be the case. The only requirement being that each of the portions be complementary to its abutting or mating portion. Further, it should be noted that while the guide surfaces 30 and 31, including the notches 32 and tongues 33, are shown as being incorporated in the mounting plates 20, the mounting plates 20 could be dispensed with and the guide surfaces 30 and 31 then could be arranged to be incorporated in the housings of the switch mechanisms 22, should the housings be of a proper size for abutting or near abutting relationship with the switches in place in the outlet box 14.

Each of the wall switches 10 and 12 includes a portion of the mounting plate 20 which is upset from the principal plane thereof. Thus, element 36 is upset a predetermined amount and when disposed adjacent a similar wall switch overlaps a complementary portion of the mounting plate 20 of that switch. The upset portion 36 and overlap provided thereby, as is more clearly shown in Figure 2, is desirable so that the wall switches can be gang mounted. The mounting plate 20 is designed to completely cover the opening in an outlet box arranged to receive a single wall switch. However, an outlet box arranged to receive two wall switches is less than twice as wide as an outlet box arranged to receive a single switch. Thus for an outlet box arranged to receive two wall switches to properly accommodate a pair of wall switches of the type shown, it is desirable to provide the upset element 36 and the resulting overlap provided thereby.

A unitary transparent Plexiglas cover member or plate 40 is shown in place with respect to the switches 10 and 12. Normally, a paper insert is disposed in the cover plate, with appropriate openings for passage therethrough of the actuators 25, so as to blend in or contrast with the decor of the area or room wherein the wall switches are located. For the sake of clarity, the insert has not been shown. As was mentioned previously, the mounting plates 20 are so provided as to completely cover the opening of the outlet box 14. Due to the utilization of inflammable material, the Plexiglas cover member 40 and the paper insert, not shown, adjacent the switch mechanisms 22, it is desirable to separate the insert from the switch mechanisms 22 and this is accomplished by mounting plates of the type set forth above. The cover plate 40 includes a surface 39 substantially perpendicular to the axis of the actuators 25 of the switches 10 and 12 which is disposed at a distance from the wall 16 with the cover plate 40 in place. The cover plate 40 includes two mounting rings 42, integral with the surface 39, the inner peripheries 41 of which form the openings arranged to closely fit about the actuators 25. The mounting rings 42 each have an outer periphery 43 which cooperates with the spring fingers 29 formed from the plate 28 to maintain the cover plate 40 in place.

Because the openings formed by the mounting rings 42 are arranged to closely fit about the actuators 25, some degree of accuracy is required in locating the wall switches 10 and 12 in the outlet box 14. From what has been set forth above and from an examination of the drawing it can be seen that the abutting or mating guide surfaces 30 and 31 provide a portion of the necessary alignment which results in locating the wall switches 10 and 12 in one sense, whereas the mating notch 32 and tongue 33 provide an interlinking, interjoining arrangement which results in locating the wall switches 10 and 12 in another sense. Further, as can be seen from the drawing, the upset portion 36 of wall switch 12 cooperates with a complementary portion of the mounting plate 20 of switch 10 to thereby assist in aligning and locating the wall switches 10 and 12 in a further sense so that the mounting plates thereof are co-planar. It will be appreciated that the wall switches 10 and 12 need be but put in place in the outlet box 14, without the necessity of complex manipulation of the wall switches, so that the guide surfaces 30 and 31 mate or abut and so that the mating notch 32 and the tongue 33 interlink and so that the upset portion 36 and complementary portion mate or abut, whereupon the fastening means 19 may be secured to the mounting tabs 18 and the cover plate 40 put in place without trial and error adjustments being required.

While only two wall switches have been shown gang mounted, it is possible to gang mount any number of wall switches, inasmuch as guide surfaces, notches and tongues, and upset and complementary portions are appropriately provided on both edges of the mounting plates of the wall switches and are arranged to accommodate similar wall switches.

An examination of the design of the mounting plates 20 of the switches 10 and 12 will indicate that the guide surfaces 30 and 31, the notch 32 and tongue 33 and upset portions 36 are susceptible of being produced by simple metal working procedures.

While a single embodiment incorporating the invention has been shown and described herein the scope of the invention should be determined from the following claims:

1. An arrangement for locating push button actuated wall switches with respect to each other in an outlet box so as to properly accommodate a cover plate having openings therethrough arranged to closely fit about the push buttons of said wall switches, the combination comprising: a first push button actuated wall switch including a mounting plate having a guide surface substantially parallel to the longitudinal axis of said wall switches, said surface comprising a first portion and a second portion including a notch opening; and a second push button actuated wall switch having a guide surface substantially parallel to the longitudinal axis of said wall switch, said surface including a first portion and a second portion including a tongue element; one of said mounting plates including an upset portion with respect to the principal plane thereof proximate to said guide surface, the upset portion of said mounting plate being arranged to cooperate with a complementary portion of the other of said mounting plate proximate to the guide surface thereof, said guide surfaces and said upset and complementary portions arranged to engage each other with said switches in place in the outlet box so that said first portions abut each other and so that said second portions abut each other and so that said notch opening and said tongue element interjoin and so that said upset portion and complementary portion abut each other thereby accurately locating said wall switches for accommodating the cover plate.

2. An arrangement for locating push button actuated wall switches with respect to each other in an outlet box so as to properly accommodate a cover plate having openings therethrough arranged to closely fit about the push buttons of said wall switches, the combinations comprising: a first push button actuated wall switch including a mounting plate having a guide surface substantially parallel to the longitudinal axis of said wall switches, said surface comprising a first portion and a second portion including a notch opening; and a second push button actuated wall switch having a guide surface substantially parallel to the longitudinal axis of said wall switch, said surface including a first portion and a second portion including a tongue element, said guide surfaces arranged to engage each other with said switches in place in the outlet box so that said first portions abut each other and so that said second portions abut each other and so that said notch opening and said tongue element interjoin thereby accurately locating said wall switches for accommodating the cover plate.

3. An arrangement for locating wall switches with respect to each other in an outlet box so as to properly accommodate a cover plate having openings therethrough arranged to closely fit about the actuators of said switches, the combination comprising: a first wall switch having a guide surface substantially parallel to the longitudinal axis of said switch, said guide surface including a notch opening; and a second wall switch having a guide surface substantially parallel to the longitudinal axis of said switch, said guide surface including a tongue element; said guide surfaces arranged to engage each other with said switches in place in the outlet box so that said notch opening and said tongue element interjoin thereby accurately locating said wall switches for accommodating the cover plate.

4. An arrangement for locating switches with respect to each other in an outlet box so as to properly accommodate a cover plate having openings therethrough arranged to closely fit about the actuators of said switches, the combination comprising: a first switch including a guide surface; and a second switch including a guide surface; said guide surfaces being complementary and arranged to align said switches in a first sense with said switches in place in the outlet box, said first switch further including a male portion and said second switch further including a female portion, said male and female portions being complementary and arranged to interjoin to align said switches in a second sense with said switches in place in the outlet box, said guide surfaces and said male and female portions accurately locating said switches for accommodating the cover plate.

5. An arrangement for locating switches with respect to each other in an outlet box so as to properly accommodate a cover plate having openings arranged to closely fit about the actuators of said switches, the combination comprising: a first switch; and a second switch; said switches presenting complementary guide means arranged to mate and align said switches in a first sense with said switches in place in the outlet box, said first switch further including a protruding portion and said second switch further including a portion complementary to the protruding portion of said first switch, said portions arranged to interjoin to align said switches in a second sense with said switches in place in the outlet box, said guide means and said portions accurately locating said switches for accommodating the cover plate.

6. An arrangement for locating a plurality of devices in a supporting structure so as to properly accommodate a cover member having openings therethrough arranged to closely fit about protruding portions of said devices, the combination comprising: a first device; and a second device; said devices including locating means for aligning said devices in a first sense and a second sense with said devices in place in the supporting structure, said locating means including a first portion of each of said devices arranged to mate with the other with said devices in place in the supporting structure, said locating means also including complementary telescoping elements, one of said elements supplied by each of said devices and arranged to interlock with the other of said devices with said devices in place in the supporting structure, said locating means accurately positioning said devices for accommodating the cover member.

7. The combination comprising: a first electrical device having a mounting plate; and a second electrical device having a mounting plate; each of said mounting plates being arranged to completely cover the opening of an outlet box devised to accommodate one of said devices, the mounting plate of said first device including a portion upset along an edge thereof, the mounting plate of said second device including a portion complementary to said upset portion along an edge thereof, said upset and complementary portions arranged to be located adjacent one another with said devices located in an outlet box devised to accommodate two of said devices so that said upset portion overlaps said complementary portion thereby accommodating said first device and said second device in the outlet box whereby the principal plane of each of said mounting plates is co-planar with the other.

8. An arrangement for locating a plurality of devices in a supporting box, the combination comprising: a first device having a mounting plate; and a second device having a mounting plate; the mounting plates of said devices including locating means for aligning said devices in a first sense and a second sense with said devices in place in the box, said locating means including a first portion of each of the mounting plates of said devices arranged to mate with the other with said devices in place in the box, said locating means also including complementary telescoping elements, one of said elements supplied by each of the mounting plates of said devices and being arranged to interlock with the other with said devices in place in the box, said devices being positioned in the box so as to accommodate a cover member having an opening therethrough arranged to closely fit about protruding portions of said first device and said second device; each of the mounting plates of said devices being arranged to completely cover the opening of a supporting box devised to accommodate one of said devices, the mounting plate of said first device including a portion upset along an edge thereof, the mounting plate of said second device including a portion complementary to said upset portion along an edge thereof, said upset and complementary portions arranged to be located adjacent one another with said devices located in a supporting box devised to accommodate two of said devices so that said upset portion overlaps said complementary portion thereby accommodating said first device and said second device in the box whereby the principal plane of each of said mounting plates is co-planar with the other.

References Cited in the file of this patent

UNITED STATES PATENTS

| | | |
|---|---|---|
| 1,257,925 | Peterson | Feb. 26, 1918 |
| 1,306,852 | Klein | June 17, 1919 |
| 1,918,282 | Meuer | July 18, 1933 |
| 2,372,083 | Johansson | Mar. 20, 1945 |